United States Patent [19]

Hanson

[11] Patent Number: 4,670,936
[45] Date of Patent: Jun. 9, 1987

[54] DUST INHIBITING VACUUM HOOD

[76] Inventor: Douglas R. Hanson, 10452 Mississippi Blvd., Coon Rapids, Minn. 55433

[21] Appl. No.: 833,087

[22] Filed: Feb. 25, 1986

[51] Int. Cl.$^4$ .............................................. A21C 9/00
[52] U.S. Cl. ...................................... 15/306 B; 15/345
[58] Field of Search ................. 15/306 R, 306 B, 345, 15/346, 306 A, 308

[56] References Cited

U.S. PATENT DOCUMENTS

| | | | |
|---|---|---|---|
| 1,945,274 | 1/1934 | Hormel | 15/308 X |
| 2,719,529 | 10/1955 | Wells | 15/306 B X |
| 2,939,408 | 6/1960 | Greenberg | 15/308 X |
| 3,078,496 | 2/1963 | Doran et al. | 15/346 |
| 3,166,004 | 1/1965 | Fries | 15/306 B X |
| 3,775,806 | 12/1973 | Olbrant et al. | 15/345 X |
| 4,251,895 | 2/1981 | Caridis et al. | 15/345 X |

FOREIGN PATENT DOCUMENTS 207717  2/1968  U.S.S.R. ............................. 15/306 B

*Primary Examiner*—Chris K. Moore
*Attorney, Agent, or Firm*—Kinney & Lange

[57] ABSTRACT

A vacuum hood for removing flour, dust, and other small particles from bakery products (dough pieces), including baffling which provides desired airflow paths adjacent leading and trailing edges of the hood. The hood overlies bakery products as the products are carried in pans on a conveyor belt moving in a path prior to baking. The hood has conduits for directing jets of air under pressure through orifices against the bakery products tending to lift the products at the same time that a vacuum is drawing particles of material inwardly under the edges of the hood to insure that excess flour, and other light particulate materials are drawn up into the hood efficiently without creating regions where the flour and particles may fall back onto the pans that are holding the bakery products. The air jets from above tends to circulate around the pockets in the bakery pans for the product causing currents that tend to lift the bakery products, so that crumbs, baking residues, and flour and any other dust particles are removed.

11 Claims, 4 Drawing Figures

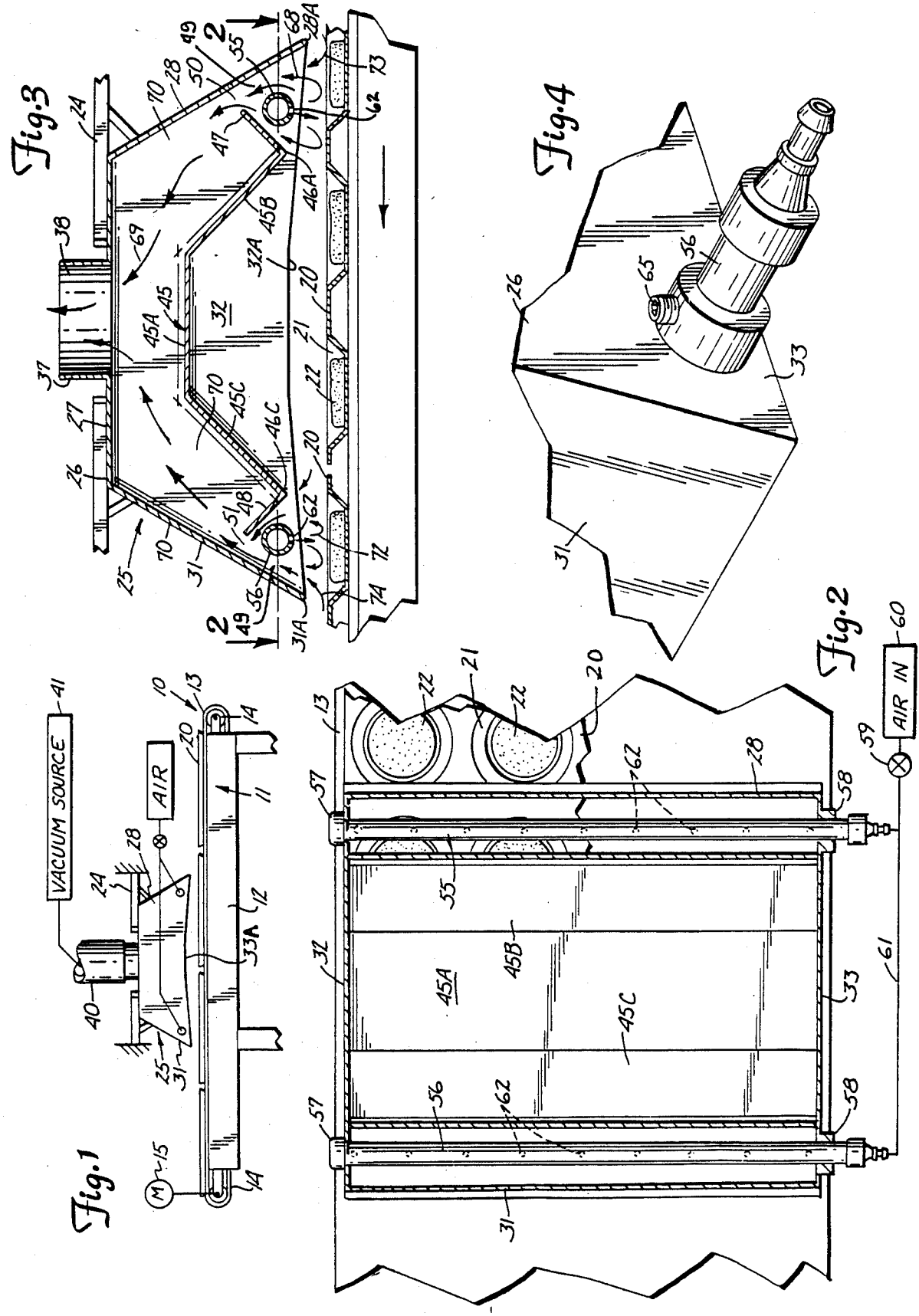

DUST INHIBITING VACUUM HOOD

BACKGROUND OF THE INVENTION

1. Field of the Invention

The present invention relates to dust and small particle control devices in bakery handling systems.

2. Description of the Prior Art

U.S. Pat. No. 4,144,615 shows a type of hood that is used for removing particles from bakery pans that are being moved along a conveyor, and has air pressure as well as vacuum. However, the hood is not suitable for properly and efficiently handling the fine particles such as flour and the like present on unbaked bakery products (dough pieces) that have been placed into pans.

Various other dust control or particle control devices have been advanced, but none provide the features of lifting the product slightly from the pans as the products are conveyed, to thereby collect all loose particles, such as excess flour and the like, from the bakery product.

SUMMARY OF THE INVENTION

The present invention relates to a bakery product handling system including a vacuum hood for removing particles of flour, seeds, crumbs and the like from unbaked bakery products and pans carrying the products as the products are conveyed from one location to another. The hood construction insures that all of the very loose, small particles are picked up, and not scattered or dropped after being picked up.

The device comprises a hood that is supported above the pans of conveyed unbaked bakery products (also called dough pieces), with the lower edges of the hood defining a rectangular perimeter. The hood includes leading and trailing edges with respect to the direction of movement of the bakery product, and has side edges that join the leading and trailing edges. An interior baffle wall is provided to define a passageway and air is taken in along the leading and trailing edges only. A vacuum source is provided to form a flow of air along the leading and trailing edges up through passageways in the hood above the baffle.

Further, laterally extending conduits are provided adjacent to the leading and trailing edges for directing pressurized air jets downwardly onto the bakery product and pans that pass beneath, to tend to lift the product or dough piece and insure that all loose particles, dust, flour and the like are made airborne so that the particles can be removed by the vacuum induced flow at the leading and trailing edges of the hood.

The baffle wall provides a solid barrier wall to insure that there is no flow in the center portions of the hood, where the large volume would cause a reduced air velocity and thus tend to permit particles that had been entrained to drop out. An adequate airflow is maintained through the passageways that are provided to insure satisfactory dust control.

BRIEF DESCRIPTION OF THE DRAWINGS

FIG. 1 is a schematic side elevational view of a typical bakery conveyor showing a hood made according to the present invention installed thereon;

FIG. 2 is a sectional view taken generally along line 2—2 in FIG. 3;

FIG. 3 is a vertical sectional view taken at the center of a vacuum hood made according to the present invention; and FIG. 4 is a fragmentary perspective view showing a typical air pressure conduit mounting arrangement used with the hood of the present invention.

DETAILED DESCRIPTION OF THE PREFERRED EMBODIMENT

A bakery product system shown schematically at 10 comprises a conveyor assembly 11, that has a frame 12 and a conveyor belt 13 mounted on end rollers 14, 14 and driven through a suitable electric motor 15 in a conventional manner. The conveyor belt 13 is used for supporting a plurality of bakery pans indicated generally at 20, in which individual dough pieces 22 forming a bakery product are placed in the pan pockets 21. The bakery pans 20 generally will have four dough pieces in pockets in direction across the conveyor belt, and perhaps six dough pieces or more in direction of movement of the conveyor. The shape of the pans 20 can be varied, but in the form shown the pans 20 have round pockets 21 and the pans move the unbaked dough pieces from a location where the "panning" operation takes place to the oven or holding and rising area. The speed of conveyor movement can vary, and can be controlled by adjusting the speed of the motor 15.

After the dough pieces 22 have been formed, they usually are covered with a light coating of flour, and additionally the individual pockets 21 in the pans 20 may have pieces of crust or crumbs from previous baked buns or other residue, such as seeds, trapped in the pockets. In order to have clean baked products and avoid dust formed by the flour, a dust control device indicated generally at 25 is provided. The dust control device 25 is supported on suitable support members 24 which are shown schematically, and these support members can be adjustable in height so that the dust control device can be raised or lowered relative to the conveyor belt 13 as desired. The dust control device 25 comprises a hood 26 which is shown as rectangularly shaped in plan view and which has a top wall 27, a leading wall 28, which is the first wall that the bakery products will reach when the products are moving in the direction as shown by the arrow 29 and a trailing wall 31. Both the leading and trailing walls 28 and 31 are joined to the top wall 27, and there are side walls 32 and 33, respectively that extend between and join the leading and trailing walls 28 and 31 and top wall 27. The walls 28 and 31 are both inclined toward each other in direction away from the conveyor belt 13.

The walls 28, 31, 32 and 33 have lower edges adjacent, but spaced from, the upper surface of the conveyor belt sufficiently to permit the pans 20 to pass underneath. The hood 26 has a leading edge 28A, and a trailing edge 31A as shown in FIG. 3. The side walls 31 and 32 have lower edges as well. As shown, the edge 32A of the wall 32 and 33A of the wall 33 are raised slightly from the leading and trailing edges 28A and 31A.

The top wall 27 of the hood has a neck or collar 37 formed therein to define an opening 38, and the neck 37 is connected to a pipe 40 that in turn leads from a suitable vacuum source 41 so that a negative pressure is created, to create an airflow through the passageway or opening 38 in neck 37. An interior, imperforate baffle wall 45 is positioned inside the hood member 26, and extends between the side walls 32 and 33.

The baffle wall 45 as shown has a generally horizontal top section 45A and downwardly tapering sections 45B and 45C that extend downward to bend lines or edges 46A and 46B near the lower edges 32A and 33A. The baffle wall 45 then has formed portions 47 and 48 that are bent upwardly and extend toward the leading and trailing walls, respectively. The bend portions form downwardly open chambers 49 that extend across the hood. The wall portions 47 and 48 terminate at locations spaced from walls 38 and 31 to define inlet opening 50 and 51, respectively, which lead to the plenum chamber or passageways 70 defined by the baffle wall 45.

The chambers 49 formed by baffle wall portions 47 and 48 and the adjacent leading and trailing walls have cross conduits 55 and 56, respectively, mounted therein. The conduits 55 and 56 are mounted on suitable collars as shown at 57 and 58, on opposite ends of the hood 26, and these collars are fixed to the walls 32 and 33. Conduits 55 and 56 are above the lower edges of the hood 26 so they do not interfere with the passage of the bakery pans. The conduits 55 and 56 are connected to a source of air under pressure 60 through a conduit 61 and suitable regulator 59 used for adjusting the the air pressure from the source 60.

The conduits 55 and 56 have a plurality of orifices 62 defined through their walls and these orifices are evenly spaced along the length of the conduits transversely across the conveyor belt to overlie the bakery pans as the bakery products are moved by the conveyor belt. The collars 58 at wall 33 are provided with suitable set screws shown at 65 in FIG. 4, so that the angle of the conduits about their longitudinal axes can be changed, and as can be seen in FIG. 3, this will change the orientation of the axes of the orifices 62 relative to the plane of the conveyor belt so that the direction of emission of the jets of air from these orifices can be changed.

It should be noted that the orifices 62 have central axes that are perpendicular to the longitudinal axis of the conduit in which the orifices are formed. The orifice axes of each conduit lie on a common plane that intersects the central axis of the respective conduit 55 and 56.

The air under pressure from air source 60 can be regulated, and as shown in FIG. 2 the airflow or air jets are indicated by the arrows 68. The orifices in the conduit 55 can be directed so that the air jets will strike the pans 20, and will enter the pockets 21 holding the dough pieces or bakery products 22 and will provide a flow that tends to lift the dough pieces up from the pans. Because of the circular pockets, an airflow is generated underneath these dough pieces to lift particles and loose flour. At the same time, the flow indicated by the arrows 69 from the vacuum source 41 causes a flow through the openings 50 and 51, so that the dust is sucked up into the passageways 70 defined by the baffle wall 45.

The conduit 56 adjacent the trailing edge can be adjusted in angle so that the airflow which is indicated by arrows 72 also enters the pockets 21 and will tend to blow dust or flour off the top of the bakery product and also to float the bakery product for a second time so dust can be removed near the trailing edge 31A of the hood.

The vacuum source 41 is of sufficient size so that air will be drawn in primarily under the leading and trailing edges as indicated by the arrow 73 at the leading edge and arrow 74 at the trailing edge. The airflow will carry the flour that is present on the dough pieces and any loose particles, seeds and the like so that the particles will be carried out the pipe 40. Suitable separators or filters can be used to control the dust at a remote location. The openings 50 and 51 are made so that the space is small enough to insure that the flow of air into the passageways 70 above the baffle wall 45 is high enough in velocity to keep all of the dust suspended within the hood and is not permitted to escape.

By adjusting the angle of the conduits 55 and 56 so that the orifices 62 direct air in selected directions, a desired pattern can be obtained, and because the hood 26 has the unique baffle 45 including the upturned wall portions 47 and 48 that form chambers 49 for the conduits 55 and 56 and define the narrow openings 51 and 52 at the leading and trailing edges, respectively, there is no dead space where the air reduces significantly in velocity. Flour or particles will not be permitted to drop back down onto the dough pieces and conveyor belt once it has become entrained, and the particles cannot escape out under the lateral sides of the hood 26 either.

Another feature is to have the airflow and pressure from regulator 59 sufficient so that the air jets from the orifices 62 keep the bakery products or dough pieces 22 levitated or lifted for a short distance. The airflows can move loose flour and particles from underneath the dough pieces for good control.

Although the present invention has been described with reference to preferred embodiments, workers skilled in the art will recognize that changes may be made in form and detail without departing from the spirit and scope of the invention.

What is claimed is:

1. For use in a bakery product handling system, including means for moving individual pieces of product having flour content in a path of movement, the improvement comprising:
    a particle removal hood having a length extending in direction of movement of the bakery product, and a transverse width spanning the bakery product;
    said hood having an open bottom facing the bakery product defining leading, trailing and side edges, said leading and trailing edges being spaced apart in the direction of movement of the bakery product;
    an imperforate baffle on the interior of said hood defining a chamber between an inner surface of the hood and the baffle, and defining openings adjacent the leading and trailing edges;
    a source of vacuum to provide for a flow of air upwardly through said openings only, said baffle preventing airflow in the other portions of said hood;
    at least one air distributor postioned adjacent at least one of the leading and trailing edges, and providing orifice means for directing jets of air pressure against said bakery product as the product moves in a direction from the leading edge to the trailing edge; and
    said vacuum causing sufficient volume of air movement so that air is drawn through the openings along the respective edges of the hood.

2. The apparatus as specified in claim 1 wherein there are air distributors having orifices on both the leading and trailing edges, the air distributors comprising conduits extending generally parallel to the leading and trailing edges.

3. The apparatus as specified in claim 2 wherein said conduits are adjustable angularly about their longitudinal axes, and said orifices have orifice axes generally perpendicular to the longitudinal axis, and the orifices axes extending on a generally common plane along the length of the respective conduits.

4. The apparatus as specified in claim 3 wherein the bakery product handling system includes a product conveyor belt, and said hood being positioned to overlie said conveyor belt, and wherein there are a plurality of rows of bakery product extending transversely across the conveyor belt, the rows passing under said hood as the bakery products are moved by the conveyor belt.

5. The apparatus as specified in claim 2 and means to adjust the airflow through said orifices to a sufficient volume in relation to the position of the baking products to lift the bakery products individually as they pass below the orifices.

6. The apparatus as specified in claim 2 wherein said hood has leading and trailing walls extending from the leading and trailing edges and tapering inwardly toward each other in upward direction away from the bakery product, and the baffle having upwardly bent edge portions spaced from said leading and trailing walls, said bent edge portions commencing from lower edges spaced from the leading and trailing edges and positioned adjacent the means for moving and being bent to extend toward the respective leading and trailing walls and also to extend in direction away from the means for moving, and terminating spaced from the respective leading and trailing walls to define said openings at locations spaced farther from the means for moving than said lower edge, and said leading and trailing edges to define recessed chambers above the leading and trailing edges, said conduits being positioned in the respective recessed chambers and spaced from the leading and trailing walls of the hood to provide a space for airflow past the conduits along the interior of the leading and trailing walls of the hood, to the defined openings, respectively.

7. The apparatus as specified in claim 2 and means to permit adjustment of the conduits angularly about the longitudinal axis thereof with respect to the hood.

8. A vaccum hood for use in a bakery handling system including:
conveyor means for moving bakery products in a path, the hood having a length and a transverse width, and defining leading and trailing edges, said leading and trailing edges being spaced in the direction of movement of a bakery product with which the hood is used;
a continuous imperforate baffle wall on the interior of said hood to form passageways between the hood and the baffle wall and further defining elongated transversely extending openings adjacent the leading and trailing edges; and
a source of vaccum connected to the passageways to provide for a flow of air through said openings into the passageways;
said baffle preventing airflow in portions of said hood other than the passageways.

9. The apparatus of claim 8 and elongated conduit means positioned adjacent at least one of the leading and trailing edges, and extending transversely across the hood, the conduit means having orifice means for directing air under pressure against bakery products moving from the leading edge to the trailing edges under the hood.

10. The apparatus as specified in claim 9 wherein said conduit means is adjustable angularly about the longitudinal axis, and said orifices have orifice axes generally perpendicular to the longitudinal axis and extending on a generally common plane along the length of the conduit means.

11. The apparatus as specified in claim 10 and means to adjust the airflow through said orifices to a sufficient volume to levitate bakery products passing underneath the hood individually from the conveyor belt as they pass below the orifices.

* * * * *